US008170138B2

(12) United States Patent
Pinkney (10) Patent No.: US 8,170,138 B2
(45) Date of Patent: May 1, 2012

(54) SIGNAL GENERATOR AND METHOD (76) Inventor: John Pinkney, Calgary (CA)

(*) Notice: Subject to any disclaimer, the term of this patent is extended or adjusted under 35 U.S.C. 154(b) by 760 days.

(21) Appl. No.: 12/178,507

(22) Filed: Jul. 23, 2008

(65) Prior Publication Data
US 2009/0028269 A1 Jan. 29, 2009

Related U.S. Application Data (60) Provisional application No. 60/951,626, filed on Jul. 24, 2007.

(51) Int. Cl.
H04L 27/00 (2006.01)

(52) U.S. Cl. ........ 375/295; 375/135; 375/146; 375/261; 375/268; 375/271; 375/272; 375/274; 375/279; 375/298; 375/300; 375/303; 375/308

(58) Field of Classification Search .................. 375/295, 375/135, 146, 261, 266, 271, 272, 274, 279, 375/298, 300, 303, 308; 704/228, 229, 269
See application file for complete search history.

(56) References Cited

U.S. PATENT DOCUMENTS

| 3,824,455 A | 7/1974 | Levitt et al. |
| 4,037,159 A | 7/1977 | Martin |
| 4,560,961 A | 12/1985 | Kestenbaum |
| 5,019,825 A | 5/1991 | McCorkle |
| 5,204,877 A | 4/1993 | Endo et al. |
| 5,258,937 A | 11/1993 | Blackmon |
| 5,574,749 A | 11/1996 | Vander Mey et al. |
| 6,616,254 B1 | 9/2003 | Raphaeli et al. |
| 6,892,075 B2 | 5/2005 | Ojard et al. |
| 6,940,893 B1 | 9/2005 | Pinkney et al. |
| 7,925,224 B2 | 4/2011 | Pinkney |
| 2002/0064207 A1 | 5/2002 | Li |
| 2002/0090036 A1* | 7/2002 | Matsusaka ..................... 375/296 |
| 2007/0053422 A1* | 3/2007 | Kisovec et al. ................ 375/239 |
| 2008/0181046 A1* | 7/2008 | Vergnes et al. ............. 365/233.1 |
| 2008/0212706 A1* | 9/2008 | Nakahara et al. ............. 375/267 |

FOREIGN PATENT DOCUMENTS

WO WO 2006/104054 * 10/2006

OTHER PUBLICATIONS

International Search Report in corresponding international application PCT/CA2008/001344 published Jan. 29, 2009 as WO2009012582.
Huemer, M., et al. "Design and verification of a SAW-based chirp spread spectrum system", Proceedings of the IEEE MTT-S International Microwave Symposium, Jun. 1998, vol. 1, pp. 189-192.

* cited by examiner

Primary Examiner — Dhaval Patel (57) ABSTRACT

There is an apparatus and technique for generating a sequence of modulated waveforms of finite duration in which the difference in start time of each waveform is shorter than the waveform's overall duration and each waveform in the sequence has independent data modulation imparted upon it. The apparatus consists of a bank of memory cells arranged in an N×M configuration with associated control circuitry, along with an arrangement scheme for the data in the N×M memory cells such that the waveforms will be correctly reproduced when the memory cells are addressed by the control circuitry in the prescribed order.

9 Claims, 7 Drawing Sheets

SIGNAL GENERATOR AND METHOD

CROSS-REFERENCE TO RELATED APPLICATIONS

This application claims priority from U.S. provisional application Ser. No. 60/951,626 filed Jul. 24, 2007.

BACKGROUND

With the advent of the software-defined radio, many choices now exist for signals which can be used in the transmission of data in a wireless communications system. The reproduction of these signals is often a complex process; one of the most commonly accepted techniques is to store the signals as digitized samples in memory, and then read those samples at some prescribed rate into a digital-to-analog converter. This technique is commonly called Arbitrary Waveform Generation (AWG) and may be used to re-create any signal provided the bandwidth of the signal being produced is less than half the rate at which the samples are read out of memory (this is commonly referred to as the Nyquist criterion for signal reproduction).

In a communications system using AWG-type waveform generation, each individual transmitted data symbol must be represented by a complex (i.e. vector) analog signal which is reproduced from its individual digitized samples stored in memory. In sophisticated communications systems, large arrays of memory are required to store all the samples needed to reproduce all the analog signals which are required for the communications system to function.

The problem is further exacerbated if the communications system uses signals of long duration, since the number of digitized samples (and, correspondingly, the amount of memory needed) increases proportionately with the duration of the signals.

In spread spectrum-type communications systems it is common that the analog signals occupy a bandwidth many times greater than that of the data which is being transmitted. This further increases the memory requirements, since the analog signals must be sampled at rates much higher than the Nyquist rate of the transmitted data. In addition, spread spectrum communications systems often use N-ary forms of signaling, wherein one of N different transmitted analog signals is used to represent each data symbol (for pseudo-noise sequence based systems, this is called Code Shift Keying). This form of modulation is advantageous since it reduces the required symbol rate by a factor of $\log_2 N$. Sampled versions of each of the N analog symbols must be stored, further increasing the memory requirements in the transmitter.

Figure 7:
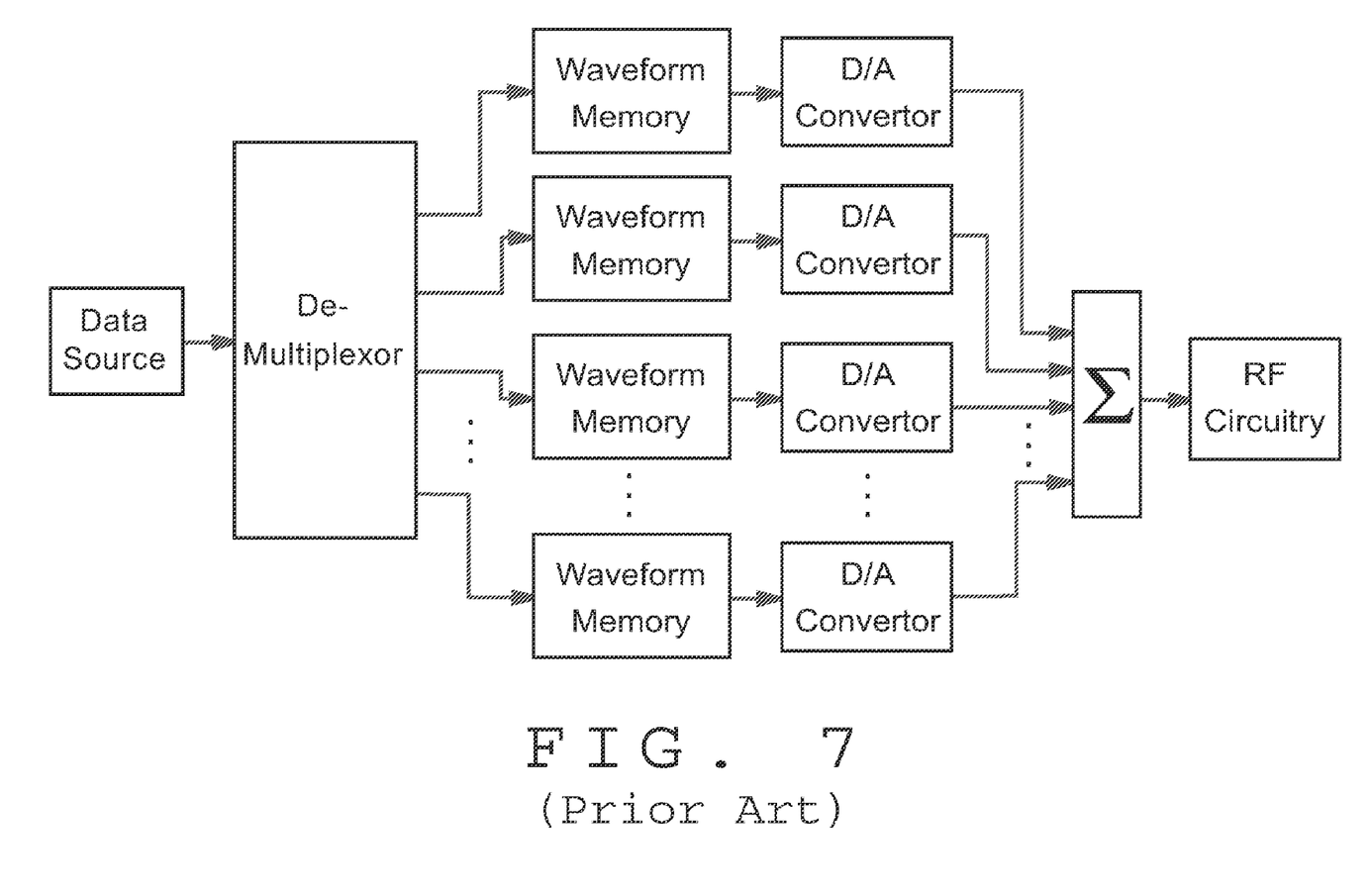
FIG. 7 is an example of an O-level overlapping system which would be implemented using Prior Art techniques.

This situation is further compounded when the transmitted signals have a duration which is longer than the time period between the start of each of the data symbols. This circumstance may arise when signals with large time-bandwidth products are used, for instance in a chirp-based communications system. If the duration of each of the transmitted analog signals has some time, T, and the time period between the start of each of the data symbols has some shorter time, $\tau$, then at any point there will be $T/\tau = O$ overlapping signals which must be synthesized by the transmitter. Each of these signals must be produced independently, usually by O independent synthesizer paths having their own memory, associated addressing, control circuitry, and digital-to-analog conversion. This typical configuration is shown in the Prior Art block diagram of FIG. 7. To generate the complete transmitted signal, all of the O signals must be summed together at the output of their respective digital-to-analog converters.

Thus a major concern in a communications system which uses sampled signals to represent transmitted data is one of hardware complexity. Specifically, there are two factors which dominate: first, for a system which uses a spread-spectrum form of modulation, the sample rate of the transmitted signal must be many times higher than the sample rate of the data to be transmitted. This means that the hardware must function at much higher clock rates than is required by the symbol rate of the data. From a power consumption and complexity perspective, it is always preferable to minimize the circuitry which operates at the system's highest clock speeds. Second, if the system is transmitting overlapping signals, an independent signal path must be provided for each of the O overlapping signals (as shown in Prior Art FIG. 7), thus increasing the amount signal generating circuitry by the same amount.

It is possible to reduce the number of D/A converters to a single device by summing the digital samples as they are clocked out of memory, before passing them to the D/A converter. In order to do this, an O-input binary adder must be inserted before the D/A converter and the number of bits of resolution of the D/A converter must be increased. Since this part of the transmitter's circuitry operates at the system's highest clock speeds, doing this will increase the power requirements of the transmitter significantly. All in all, the extra circuitry required does not garner much of an advantage over using O separate D/A converters.

In a communications system which uses large time-bandwidth product signals to represent data symbols (for instance, chirp signals in Chirp Spread Spectrum systems), not being able to overlap the transmitted signals creates severe performance constraints. This is because the time-bandwidth product of a chirp signal represents a figure of merit comparable to processing gain in other types of spread spectrum system, and it behooves the communications designer to use signals with as large a time-bandwidth product as possible to take advantage of the benefits processing gain provides.

On the other hand, any large time-bandwidth product signal (be it a chirp signal or whatever) will, by definition, be long in duration. If signals in a communications system are not allowed to overlap, then the transmitter must wait for the current signal to end before starting transmission of the next signal. This means that, in such a circumstance, the duration of the data symbols is set by the duration of the transmitted signal. As mentioned above, this duration is typically quite long for signals with a large time-bandwidth products. A long duration between data symbols means lower data throughputs. If more data throughput is needed, the time-bandwidth product of the transmitted signals must be reduced, which reduces processing gain. Thus there is a natural tradeoff between processing gain (i.e. time-bandwidth product) and data rate (i.e. the duration of the data symbols) in non-overlapping systems.

Many signals with large time-bandwidth products (including chirp signals) have a property called Time Shift Orthogonality which ensures similar signals are orthogonal to each other provided they observe a minimum spacing of their start times. The required minimum spacing is related to the signal's occupied bandwidth, and is generally very small in relation to the duration of the signal. If time-shift orthogonality is taken advantage of, and large time-bandwidth product signals are allowed to overlap, then the data rate and the processing gain of the transmitter may be chosen independently.

U.S. Pat. No. 5,204,877 ('877 patent), published Apr. 20, 1993 and titled "Spread Spectrum modulating device" describes a hardware structure for producing PN sequences from a waveform memory with a counter and shift register; however, it can generate only multiple "spread spectrum codes" (PN sequences) and uses only either Code Shift Keying (CSK) or On-Off Keying (OOK) as a modulation method. The '877 patent cannot use arbitrary waveforms nor use any type of modulation. Also, the length M, of the counter is equal to the spread spectrum code (i.e. the signal) length, which may be detrimentally long. The '877 patent is also a "data multiplexer", turning a serial stream of data into parallel signal streams, which may be disadvantageous.

This device and method provide a solution to the pitfalls of increased complexity and power consumption when using a transmitter which transmits data with overlapping signals with large time-bandwidth products. Overlapping the signals allows the symbol rate and the processing gain in such systems to be chosen independently, thus improving their performance.

SUMMARY

In an embodiment there is provided a method for transmitting information in a communication system in which information is transmitted in the form of symbols represented by signals, and in which the duration of the signals is longer than the time period between the start of one symbol and the next. The method comprises the steps of: a) synthesizing synthesized waveforms from stored digital data representing waveforms resulting from the summation of overlapping signals, and b) transmitting the synthesized waveforms.

In an embodiment there is provided a transmitter portion of a communications system. There is a memory storage system, in which is stored data representing waveforms resulting from the summation of overlapping signals. Control and clocking circuitry is configured to read data from the memory. There is at least one digital-to analog converter which converts the data to an analog signal.

In an embodiment there is provided a hardware apparatus and an associated digital memory along with a method of arranging data in that memory such that the complexity of both hardware and software, as well as the power consumption required to generate overlapping signals with large time-bandwidth products is greatly reduced. By employing this apparatus and method as a part of a transmitter in a communications system, a many-fold reduction in hardware complexity will be enjoyed. Furthermore, this apparatus and method allow for a great deal of flexibility in both the types of signals used in the communications system, as well as the variation of system parameters without requiring significant modifications to the transmitter hardware; in some cases this variation may even occur dynamically while the system is in operation.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

The hardware portion consists of N by M memory cells, each cell having a certain number of bits (usually between 8 and 16), which can be accessed in parallel. The value of N is related to the overlap factor, O, by 2 to the power of the first integer equal to or greater than O. The value of M is the number of signal samples in one symbol period, which is determined by the bandwidth of the transmitted signal and the sample rate of the signal which is being digitally reproduced.

The nature of commercially available memory being what it is, the addressing of the N times M memory cells is usually performed via binary-encoded address lines. Thus there will be $\log_2 N$ binary address lines for the N memory cells, and $\log_2 M$ binary address lines for the M memory cells. The $\log_2 N$ address lines are controlled by a shift register, latches, or port outputs of a microcontroller. The $\log_2 M$ address lines will be connected to a high-speed divide-by-M binary counter which is driven by a clock signal at the system sample rate. The counter is configured so that it counts up incrementally from zero to M−1 and resets back to zero, with one count for each clock cycle. This ensures that all of the M memory locations (that is, the memory cells at addresses zero to M−1) are addressed exactly once each by the counter, sequentially, before it resets.

Since there are O overlapping individual transmitted signals being reproduced at any one time, the $\log_2 N$ address lines will represent the binary values of all of the O data symbols. The order in which the transmitted symbol values are clocked into the $\log_2 N$ address lines is important. The outputs of the $\log_2 N$ shift register are wired to the N memory cells with the first shifted output of the $\log_2 N$ shift register connected to the least significant address lines of the N memory cells. The data is then shifted up one address line each time the counter controlling the M memory locations resets.

Upon startup, the first binary data symbol is written into address line $A_o$. When the divide-by-M counter resets after counting through all of its M states, the value in $A_o$ is shifted to the next address line, $A_1$, and the second binary data symbol is written into $A_o$. Upon the next counter-reset, the values in $A_1$ and $A_o$ are shifted to $A_1$ and $A_2$, respectively, and the third binary data symbol is written into $A_o$. This continues until the first binary data symbol has reached address line $A_{logN}$, which is the last of the $\log_2 N$ address lines. Upon the next counter-reset, this data symbol will be shifted out of the shift register. It should be noted that the control hardware (be it a microprocessor, or whatever) only needs to do an operation every M clock cycles and can therefore operate much slower and consume less power.

The output of the memory will be some number data lines for each N by M address. Since the N by M memory is addressed in a specific way (i.e. sequentially through the first M locations by the counter, and then randomly through the next N locations by the shift register), it is critical that the digital samples are stored in memory in the correct order. It is for that reason that the unique ordering of digital samples, as well as the hardware configuration, is important.

The ordering of digital samples in memory will now be described. The memory is organized into N by M cells, with each cell containing a numerical value corresponding to a digital sample of the signal to be transmitted. Two signals, $F_1(n)$ and $F_2(n)$, are large time-bandwidth product signals which represent the symbols "0" and "1" (when transmitted) respectively. The overall length of each of the signals $F_1(n)$ and $F_2(n)$ must be shorter than $\log_2 N$ times M samples, and should be longer than $\log_2 N-1$ times M samples.

Each of the two signals, $F_1(n)$ and $F_2(n)$, will contain $\log_2 N*M$ digital samples which are organized in $\log_2 N$ chunks of M samples each. The last, or $\log_2 N^{th}$ chunk, may contain less than M samples if the signal duration is not evenly divisible by the symbol time, and under these circumstances the $\log_2 N^{th}$ chunk must be padded with zeros to give it a total of M samples. The chunks will be denoted in the following way: $F_{11}(n)$ represents the chunk of $F_1(n)$ containing samples 1 through M, $F_{12}(n)$ represents the chunk of $F_1(n)$ containing samples M+1 through 2M, $F_{13}(n)$ represents the chunk of $F_1(n)$ containing samples 2M+1 though 3M, and so on. The last chunk of $F_1(n)$ would be denoted $F_{1\,logN}(n)$, and will contain samples $((\log_2 N-1)*M)+1$ through $\log_2 N*M$. The same nomenclature is applied to the chunks of $F_2(n)$, which are denoted $F_{21}(n)$, $F_{22}(n)$, $F_{23}(n)$, to $F_{2\,logN}(n)$.

Each memory cell will contain the sum of $\log_2 N$ individual samples from $\log_2 N$ signal chunks, and the samples which are included in the sum will be determined by the state of the $\log_2 N$ address lines which address that particular cell. For instance, if address line X has a binary state of 0, then a sample from chunk $F_{1X}(n)$ is added to the contents of that memory cell. If the state of address line X is a binary 1, then a sample from chunk $F_{2X}(n)$ is added to that memory cell. This is best illustrated with an example. The chunk of M memory cells which are addressed by the value 01101010 (in this case $\log_2 N$ is equal to 8), will have the sum of following M sample values (i.e. chunks of $F_1(n)$ and $F_2(n)$) stored in them: $F_{11}(n)+F_{22}(n)+F_{23}(n)+F_{14}(n)+F_{25}(n)+F_{16}(n)+F_{27}(n)+F_{18}(n)$. For the M memory cells addressed by 00001111, the sum of sample values would be $F_{11}(n)+F_{12}(n)+F_{13}(n)+F_{14}(n)+F_{25}(n)+F_{26}(n)+F_{27}(n)+F_{28}(n)$.

As a bit of data gets shifted sequentially through each of the $\log_2 N$ address lines, different chunks of the transmitted signal are addressed in their proper sequence, until after $\log_2 N$ shifts, all the chunks of the transmitted signal have been addressed in the correct order. This operation happens independently of the states of the other $\log_2 N-1$ address lines. In this way, any $\log_2 N$ overlapping signals can be reproduced in their entirety, independent of each other.

One important consideration in the arrangement of the summed signal samples in memory is the resolution of the memory cells. Each individual memory cell will have some number of data bits associated with it and the numerical value which can be stored in that cell must be within the range of 0 to $2^B-1$, where B is the number of bits in the memory cell. Since there are $\log_2 N$ independent signals being reproduced at any one time, care must be taken to scale the individual signals so that their sum never exceeds the maximum numerical value which can be stored in the memory cells. For instance, if the memory has 8 bits of resolution, then the numerical value of the digital samples must be within the range of 0 to 255. When all $\log_2 N$ signal chunks are summed to make the overall value stored in a cell, it must be within the range of 0 to 255. This means that, to ensure that the stored value never exceeds 255, the numerical value representing each of the $\log_2 N$ signals must be in the range of from 0 to $255/\log_2 N$. If this value is exceeded, the effect on the reconstructed signal will be to clip the output, which introduces undesirable harmonics and other distortion.

The data output of the memory cells (which is a binary-coded numerical value) is passed to the third major hardware component, the D/A converter. It is the D/A converter's job to reconstruct the analog signal from the numerical digital values stored in memory. It should be noted that the clocking speed of the D/A converter will be the same as the clocking speed of the counter (which is the system clock speed).

With the signal values stored in memory according to the scheme described above, and the addressing method described, $\log_2 N$ overlapping independently modulated signals will be reproduced by the D/A converter.

Figure 1:
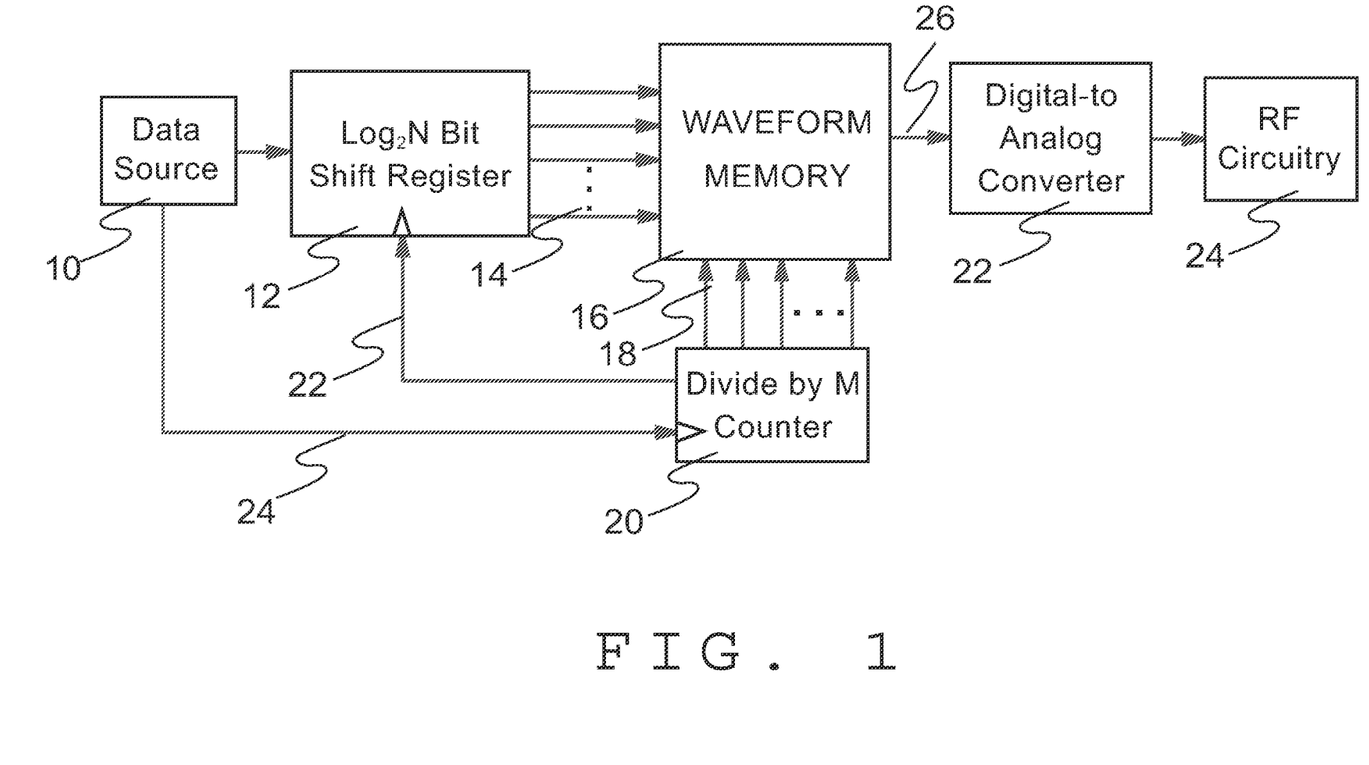
FIG. 1 shows a block diagram of a basic hardware configuration, which is used in conjunction with the organization of signal samples in memory to produce the overlapping signals.

The basic apparatus which performs the operations previously described is shown in FIG. 1. Binary data produced by a Data Source, 10, is presented to an $\log_2 N$-bit Shift register, 12. The Data Source, 10, also produces a Digital Clock Signal, 24, which completes one clock period (i.e. cycle) for each sample of the desired output data waveform. The Digital Clock Signal, 24, drives a Divide-by-M Binary Counter, 20. The output of the Binary Counter is $\log_2 M$ Control Lines, 18, which change state every clock cycle and provide a binary count of the numbers 0 through M−1 after which it resets and cycles through the M states again. A Count Carry Indicator Control Line, 22, produces a single pulse every time the Divide-by-M counter resets. This control line is connected to the clock input of the $\log_2 N$-bit Shift Register, 12.

In this configuration, the $\log_2 N$-bit Shift Register, 12, is set to shift a bit in from the Data Source, 10, each time the Divide-by-M Counter, 20, counts from 0 to M−1 and sends a carry signal through the Count Carry Indicator Line, 22. In this way a bit gets shifted into the $\log_2 N$-Bit Shift Register, 12, every M clock cycles.

Both the output lines of the $\log_2 N$-bit Shift Register (of which there are N), 14, and the output lines of the Divide-by-M Counter (of which there are $\log_2 M$), 18, are connected to the address lines of the Waveform Memory, 16. The lower $\log_2 M$ address lines of the Waveform Memory, 16, that is, lines $A_0$-$A_{logM-1}$, are connected to the outputs of the Divide-by-M counter, 18. The upper address lines of the Waveform Memory, that is, lines $A_{logM}$-$A_{logM+N-1}$, are connected to the outputs of the N-bit shift register, 14. By using this configuration, the Divide-by-M counter will cycle through a group of M memory locations in the Waveform Memory, 16, each time a bit is shifted into the N-bit Shift Register, 14.

The data cells in the Waveform Memory addressed by the Divide-by-M Counter and the $\log_2 N$-bit Shift Register appear at the Waveform Memory data lines, 26. These lines feed into a Digital to Analogue Converter, 22, which produces an analogue signal controlled by the data values outputted by the Waveform Memory. This signal (which, in FIG. 1 is a real, double-sided signal) is fed into the rest of the transmitter circuitry, which is represented by the RF Circuitry block, 24.

The hardware represented by the block diagram of FIG. 1 must be used in conjunction with a particular organization of data values in the Waveform Memory, 16, in order for the apparatus to function as intended. An example of how the data values are organized in the Waveform Memory, 16, will now be described.

Figure 2:
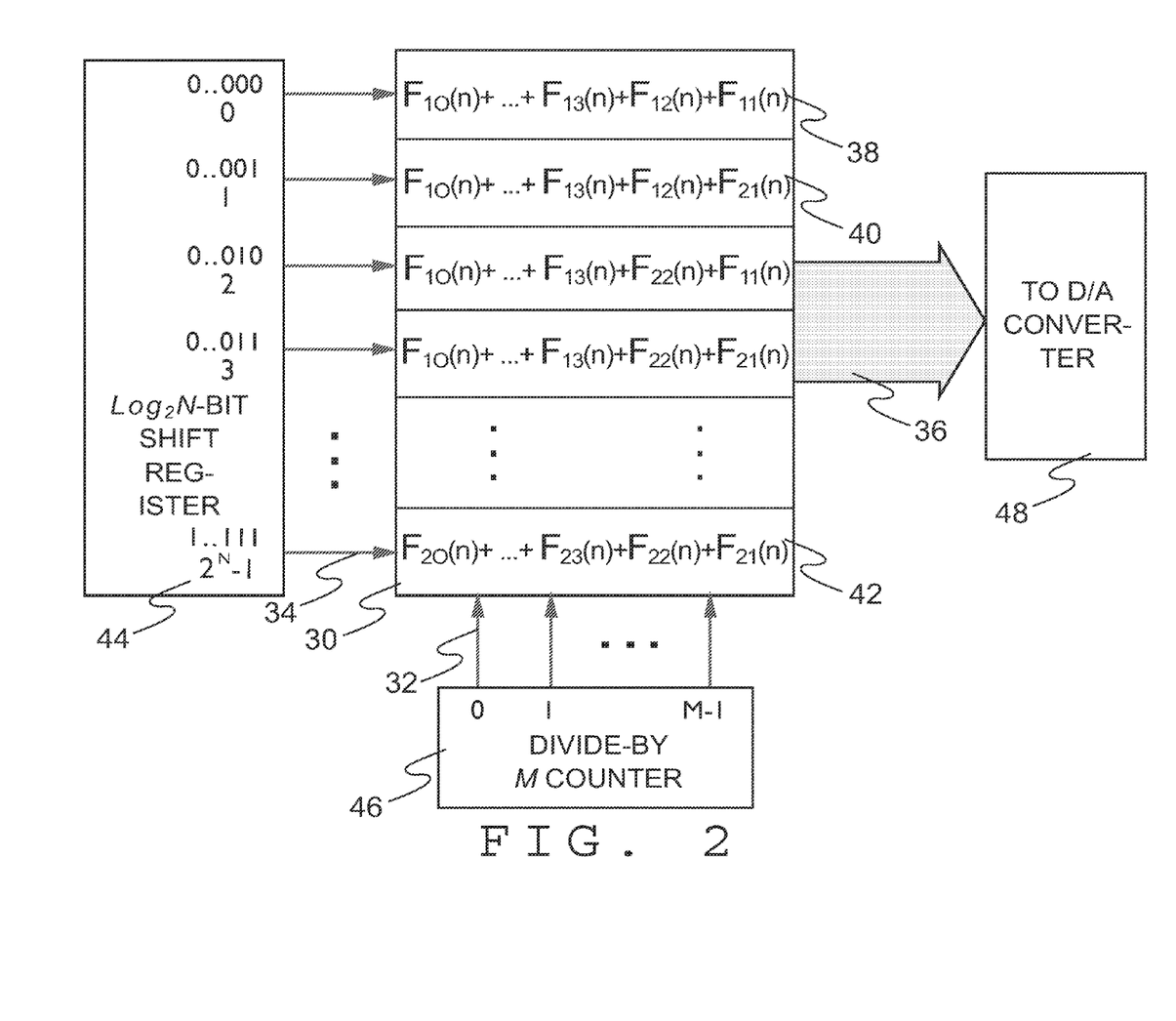
FIG. 2 shows the organization of signal chunks in an N by M memory, and how these chunks are addressed.

FIG. 2 shows the internal organization of the Waveform Memory, 16. This memory is organized into N by M cells, with each cell containing a data value which is one sample of the transmitted waveform. In FIG. 2, there are two separate large time-bandwidth waveforms which are used to represent data symbols, $F_1$ (representing a data value of "0") and $F_2$ (representing a data value of "1"). $F_1$ and $F_2$ have the same duration in the example, although this is not necessarily true in general. To store the transmitted waveforms in memory, $F_1$ and $F_2$ are broken up into $Log_2N$ separate chunks, which are denoted as $F_{11}, F_{12}, F_{13}, \ldots, F_{1LogN}$ for signal $F_1$, and $F_{21}, F_{22}, F_{23}, \ldots, F_{2LogN}$ for signal $F_2$. Each waveform chunk contains M samples.

The data value stored in each of the N by M cells in the Waveform Memory, 16, is determined by adding together $Log_2N$ samples of $F_1$ and $F_2$, obtained from chunks of the waveform according to the state of the $Log_2N$ address lines.

This is best illustrated by an example. Let us assume that $Log_2N$ is 6 (there are 6 address lines) and the value of M is 16. If the binary value in the $Log_2N$-Bit Shift Register, 44, is "011010" (this value also appears at the Waveform Memory's Address Bus, 34) then the upper 6 address lines of the Waveform Memory, 30, will point to 16 specific data values in the Waveform Memory, which will be addressed in sequence by the outputs of the divide-by-M counter. These 16 data values will consist of the sum of the 16-sample waveform chunks $F_{11}, F_{22}, F_{23}, F_{14}, F_{25}$, and $F_{16}$.

In another example, the binary value "110011" has been shifted into the $Log_2N$-bit Shift Register, 44. The data values pointed to by this address will consist of the sum of the 16-sample waveform chunks of $F_{21}, F_{22}, F_{13}, F_{14}, F_{25}, F_{26}$.

From the two above examples it can easily be seen that the value of each bit in the $Log_2N$-bit Shift Register, 44, will correspond to an M-sample chunk of either $F_1$ or $F_2$ which is summed to create the overall data value. The M-sample chunk of either $F_1$ or $F_2$ which will be added corresponds to the state of each of the $Log_2N$-bits. For instance, if the value of the first bit is a "1", then M-sample chunk $F_{21}$ is added, and if the value of the first bit in the shift register is a "0", then M-sample chunk $F_{11}$ is added. Correspondingly, if the value of the second bit is "1" then M-sample chunk $F_{22}$ is added, if the value of the second bit is "0" then M-sample chunk $F_{12}$ is added, and so on. This continues until $Log_2N$ M-sample chunks have been summed into the data value.

Figure 3:
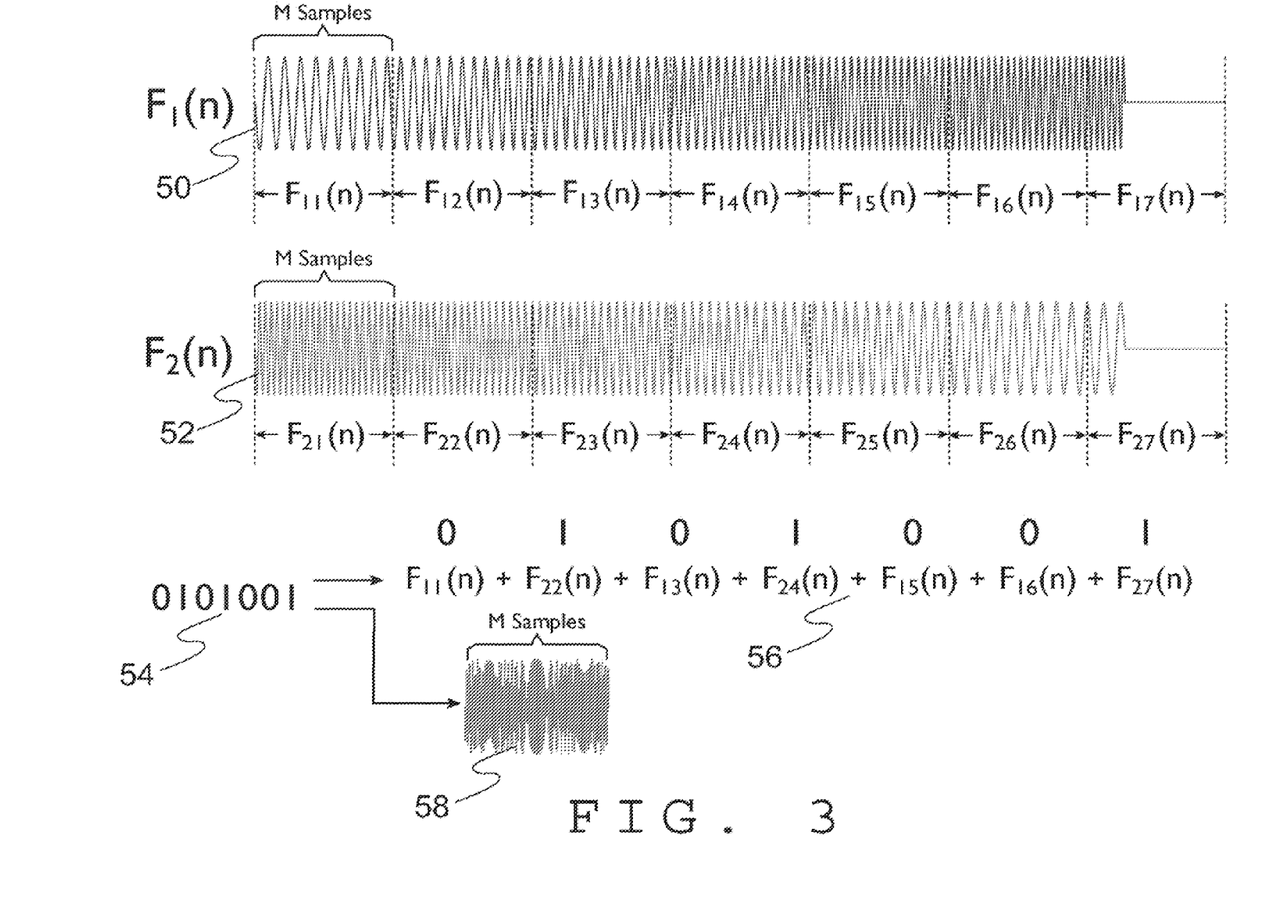
FIG. 3 shows how an example of sampled transmitted signals with large time-bandwidth products, in this case two chirp signals, $F_1(n)$ and $F_2(n)$, can be broken up into signal chunks for organization in the N by M memory.

FIG. 3 illustrates how the various M-sample length chunks are derived from the two large time-bandwidth product signals, $F_1$ and $F_2$. In FIG. 3, an up-chirp signal is used for $F_1$, 50, and a down-chirp signal is used for $F_2$, 52. The symbol period (that is, the duration between the start times of adjacent symbols), is set such that there are M Signal Samples, 56, between the start of each adjacent symbol. The overlap factor, O, is computed by dividing the length of $F_1$ or $F_2$ (whichever is greater) by the symbol period. The value of $Log_2N$, the number of bits in the shift register, is then computed by taking the first integer which is equal to or greater than O. In the example shown in FIG. 3 O is 6.3, so the value of $Log_2N$ is 7.

$F_1$ and $F_2$ are divided into chunks by first sampling the entire waveform at the desired sample rate, then grouping the samples into chunks of M samples. The first chunk of a particular waveform, $F_{x1}$, contains samples 1 through M. The second chunk, $F_{x2}$, contains samples M+1 through 2M. The third chunk, $F_{x3}$, contains samples 2M+1 through 3M, and so on. Since the waveform in the example does not contain an integer multiple of M samples, the $7^{th}$ chunk is padded with zeros so it has M samples in total.

The data value stored in a particular waveform memory location is determined both by the value of the upper $Log_2N$ address lines and the value of the lower $log_2M$ address lines. The upper $Log_2N$ address lines define the waveform chunks which are summed to produce the stored data value. The lower $log_2M$ address lines determine the sample of each chunk used to produce the sum. For instance, if the waveform memory has 12 address lines (denoted as $A_0$ through $A_{11}$), and if $Log_2N$ is 7, then address lines $A_{11}$ though $A_5$ are driven by the 7 $Log_2N$ outputs, and $A_4$ through $A_0$ are driven by the 5 $Log_2M$ outputs of the counter. Address lines $A_{11}$ through $A_5$ determine the waveform chunks which are used to produce the sum, and address lines $A_4$ through $A_0$ are used to determine the particular sample of the chunks which are used.

This is best illustrated with an example. For a memory location in the waveform memory addressed with a value of address lines $A_{11}$ through $A_5$ of "0101001" as shown in 54 of FIG. 3, samples from chunks $F_{11}, F_{22}, F_{13}, F_{24}, F_{25}, F_{26}$, and $F_{27}$, 56, are added together to produce its data value. Since the value of M is 32 ($Log_2M$ is 5), there will be 32 separate memory locations pointed to by this address value. With M is equal to 0 (i.e. address lines $A_4$ to $A_0$ have a value of "00000"), the first sample of chunks $F_{11}, F_{22}, F_{13}, F_{24}, F_{25}, F_{26}$, and $F_{27}$ are summed to produce the sample value at this address. When M is equal to 1 (i.e. address lines $A_4$ to $A_0$ having a value of "00001"), the second sample of chunks $F_{11}, F_{22}, F_{13}, F_{24}, F_{25}, F_{26}$, and $F_{27}$ are summed, and so on. The last value of M (that is, 31—address lines $A_4$ to $A_0$ having a value of "11111") will consist of the sum of the last sample of chunks $F_{11}, F_{22}, F_{13}, F_{24}, F_{25}, F_{26}$, and $F_{27}$.

All of the addressable locations in the waveform memory have their data values computed in this way, by taking the sum of the $M^{th}$ samples of $Log_2N$ chunks which are determined by the memory's address.

Figure 4:
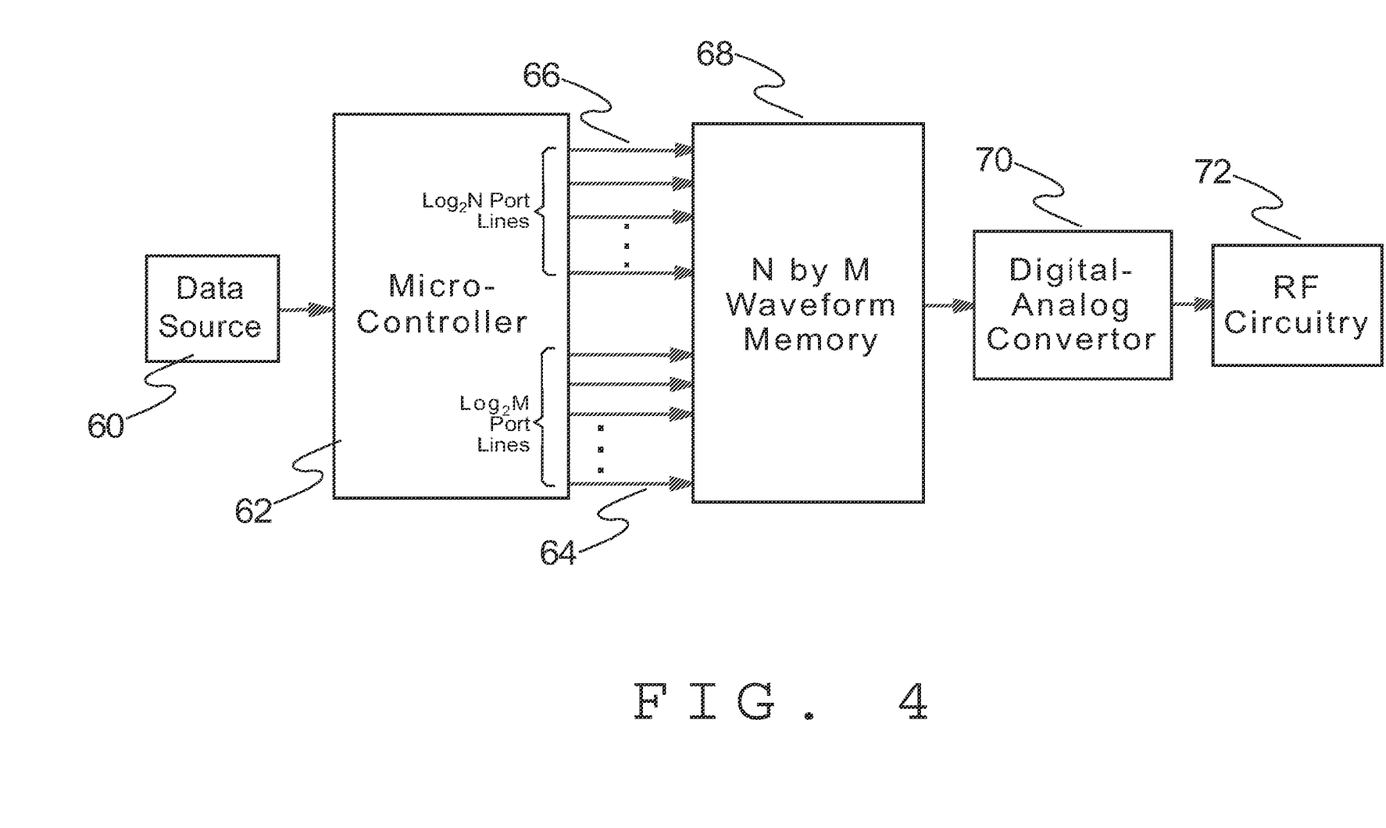
FIG. 4 shows a block diagram of an alternate hardware configuration, in which a micro-controller is used to control the waveform memory addresses rather than fixed hardware blocks.

FIG. 4 shows an alternate hardware configuration which does not require a hardware counter or shift register, but would still be compatible with the memory configuration described above. In FIG. 4, the $Log_2N$ outputs of the shift register have been replaced with the output ports of a microcontroller, 66, as have the $Log_2M$ outputs of the counter, 64. The data supplied by the Data Source, 60, is fed this time into a Microcontroller, 62, which directly controls the $Log_2N$ address lines connected to the Waveform Memory, 68. The software in the Microcontroller manipulates the output ports of the Microcontroller, 62, similar to the way the $Log_2N$-bit Shift Register, 12, (FIG. 1) manipulates its output lines.

The first bit of data to be transmitted will determine the value written to the output port connected to address line $A_{logM+N-1}$ of the N by M Waveform Memory, 68. After M clock cycles (which are generated internally by the microcontroller), the first bit is written to the port connected to address line $A_{logM+N-2}$, and the new data is written to the port connected to address line $A_{logM+N-1}$. After another M cycles, the first bit is shifted the port driving address line $A_{logM+N-3}$, the second to address line $A_{logM+N-2}$, and a new bit is written to address line $A_{logM+N-1}$, and so on.

In between writing the new bits to the output ports driving the $Log_2N$ address lines connected to the waveform memory, the Microcontroller, 62, will be counting from 0 to M−1 on the $Log_2M$ Output Port Lines, 64. This takes the place of the Divide-by -M counter. As before, the Data Output of the Waveform Memory is fed into a Digital-to-Analog Converter, 70, which generates an analog signal which drives the RF Circuitry, 72.

Since the output ports of the microcontroller are software programmable, this configuration has the flexibility of allowing the waveform to be changed while the system is in operation. For instance, the number of output address lines can be varied "on-the-fly" if alternate transmitted waveforms are desired (this could occur if a longer—or shorter—waveform us used, and/or the symbol duration is modified).

Figure 5:
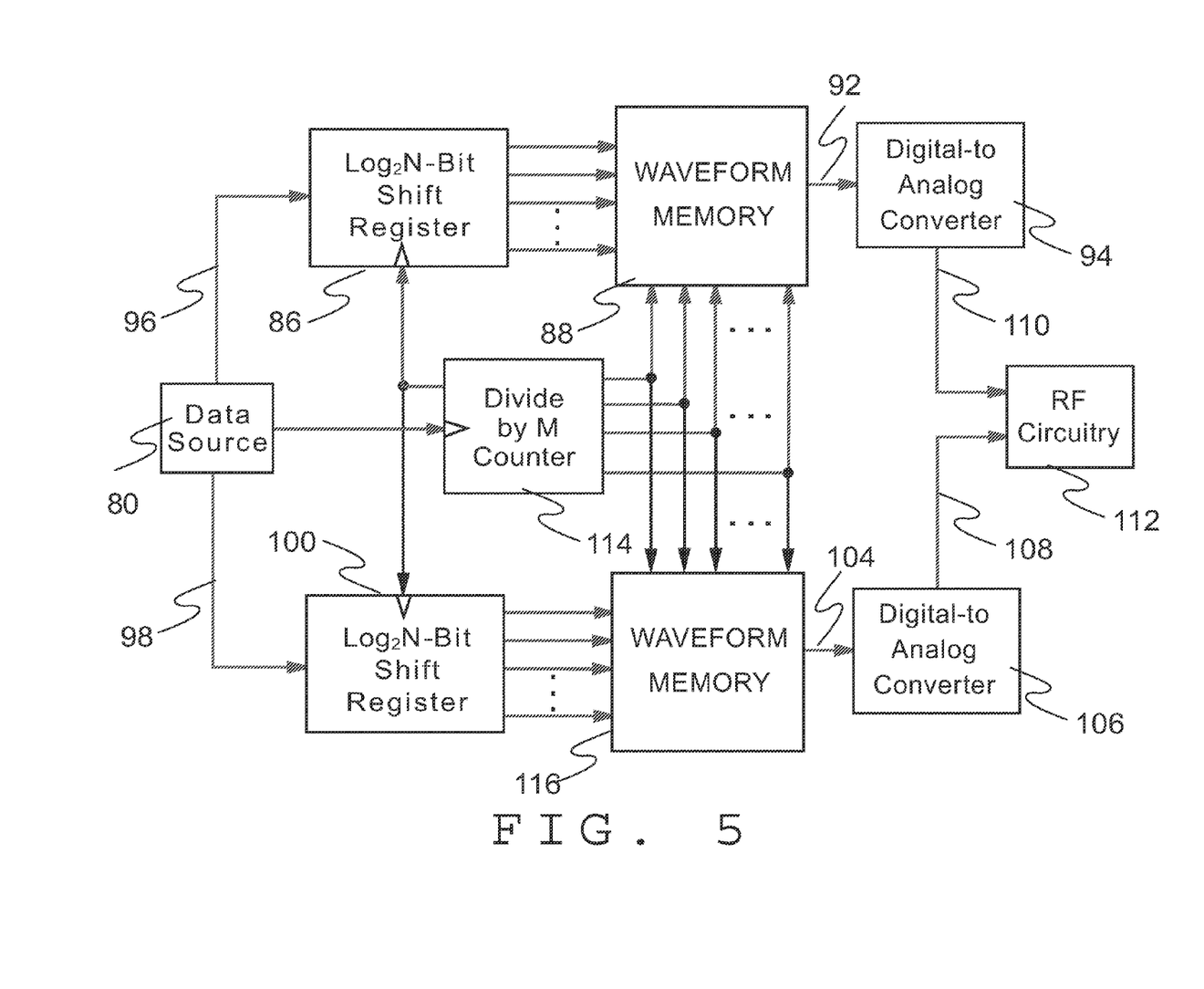
FIG. 5 shows a block diagram of an alternate hardware configuration, in which vector (i.e. I and Q) baseband outputs are produced, and subsequently upconverted to some intermediate frequency (IF) by a vector modulator.

FIG. 5 shows still another alternate hardware configuration, in which a vector (i.e. complex or "baseband") signal is produced. In this configuration, a single Divide-by-M Counter, 114, drives the lower address lines of two separate Waveform Memories, 88 and 106. The Data Source, 80, separates the binary bit stream into Inphase Data, 96, and Quadrature Data, 98. These separate data streams are fed into an Inphase $Log_2N$-Bit Shift Register, 86, and a Quadrature Inphase $Log_2N$-Bit Shift Register, 100, which drive the upper $Log_2N$ address lines of the Inphase Waveform Memory, 88, and the Quadrature Waveform Memory, 116, respectively. As before, the respective waveform memories are loaded with the sum of data samples of two different transmitted waveforms, $F_1$ and $F_2$, however, now $F_1$ and $F_2$ are vector (i.e. complex) signals containing real (inphase) and imaginary (quadrature) components. The real part of the waveforms are in the Inphase Waveform Memory, 88, and the imaginary part of the waveforms are used in the Quadrature Waveform Memory, 116. The procedure for calculating the data values is identical to the one previously described, except that the signals are now mathematically represented as $F_1=F_{1X}+jF_{1Y}$ and $F_2=F_{2X}+jF_{2Y}$, and $F_{1X}$ and $F_{2X}$ is used in place of $F_1$ and $F_2$ in the Inphase Waveform Memory, 88, and $F_{1Y}$ and $F_{2Y}$ is used in place of $F_1$ and $F_2$ in the Quadrature Waveform Memory, 116.

As before, the Waveform Data, 92 and 104, feeds into an Inphase Digital-to-Analog converter, 94, and a Quadrature Digital-to-Analog Converter, 106. These produce the Inphase Analog Signal, 110, and the Quadrature Analog Signal, 108, which then drive the RF Circuitry, 112. In this case the RF Circuitry, 112, would have to include some sort of I-Q modulator to combine the two analog signals to generate a real signal for transmission at the desired transmission frequency.

Figure 6:
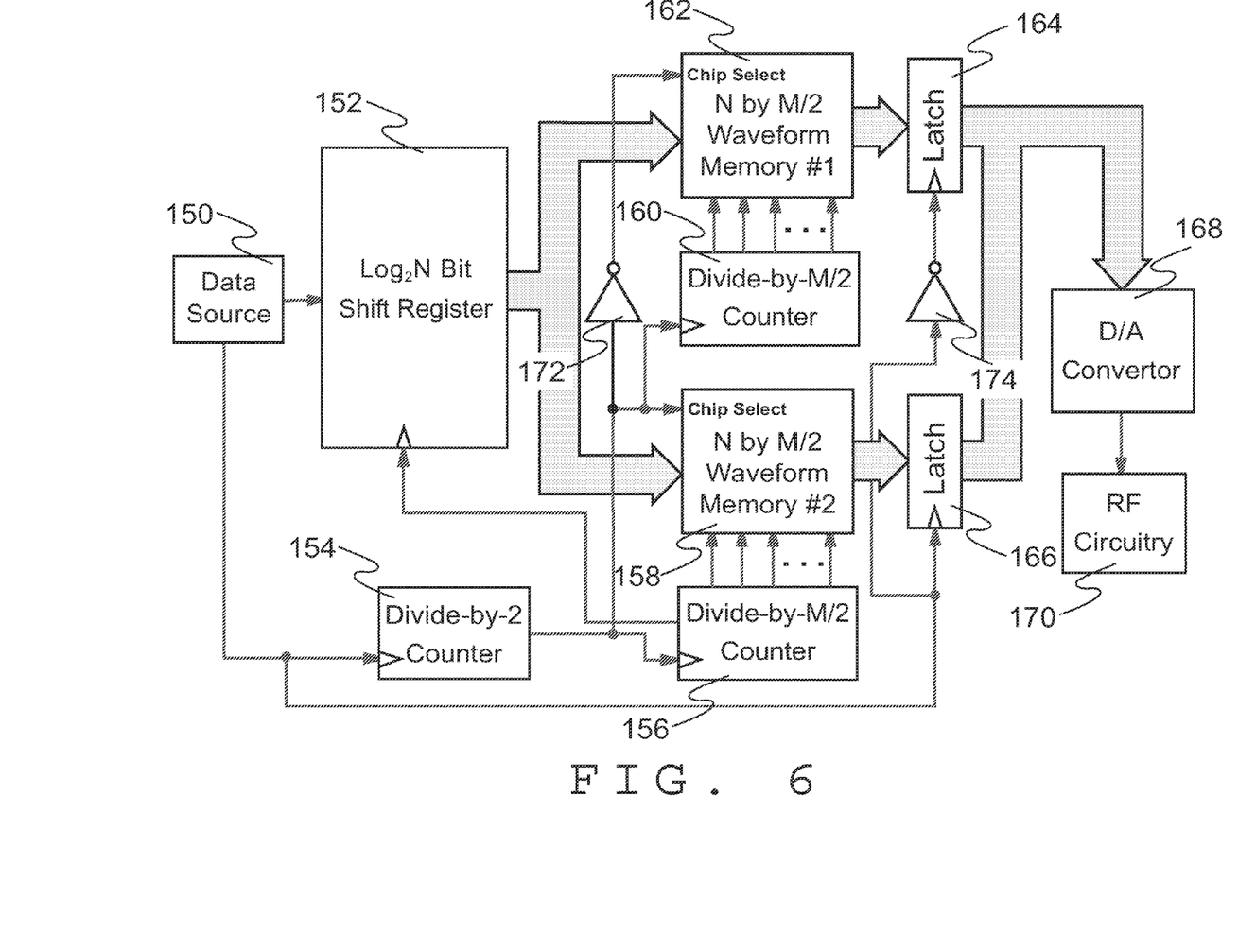
FIG. 6 shows a block diagram of an alternate hardware configuration, in which the memory is broken up into two separate blocks, allowing slower memory components to be used.

FIG. 6 shows yet another alternate hardware configuration, one which allows slower memory components to be used. In this configuration, the memory is split up into two or more physical devices, with each device being addressed half of the time. This interleaving doubles the length of time each memory chip is enabled, so slower components may be utilized.

Data from the Data Source, 150, is fed into a $Log_2N$-bit Shift Register, 152, which shifts each bit of incoming data into $Log_2N$ parallel outputs in synchronism with an incoming clock signal from Divide-by-M/2 counters, 156 160. The Divide-by-M/2 counters, 156 160, in concert with the Divide-by-2 counter, 154, performs the same function as the Divide-by-M counter, 20, in FIG. 1. As in FIG. 1, the counter is clocked with a clock output produced by the Data Source, 150. After the incoming clock signal has been divided down by the Divide-by-2 counter, 154, this clock signal is used to drive the Divide-by-M/2 counters, 156 160, which each drive the lower $Log_2M$ address inputs of the two N by M/2 Waveform Memories, 158 162. The clock input of the first Divide-by-M/2 counter, 156, should be 90° out of phase with the second Divide-by-M/2 counter, 160, and this is performed by an Inverter Gate, 172. The clock signal also provides a Chip Select line into each of the N by M/2 Waveform Memories, 158 162, and this is also 90° out of phase. In this way, one of the waveform memories is clocked and selected while the other waveform memory is deselected.

The data outputs of the N by M/2 Waveform Memories, 158 162, are fed into two separate Latches, 164 166, the outputs of which drive the common data bus connected to the D/A Converter, 168. The clock input of the Latches, 164 166, are driven by the clock from the Data Source, 150. The clock input of one of the Latches, 164, is 90° out of phase from the clock input of the second Latch, 164, by the use of an Inverter Gate, 174. In this way, the data outputs of each of the N by M/2 Waveform Memories, 158 162, are passed to the D/A Converter, 168, on alternating phases of the Data Source clock output.

Since the clock driving the two N by M/2 Waveform Memories, 158 162, has twice the duty cycle of the clock produced by the Data Source, 150, the speed of each of the N by M/2 Waveform Memories, 158 162, need only be half that of the Data Source clock. The various counters, latches, and D/A converter has to have the same speed as the Data Source clock.

In an embodiment there is a transmitter portion of a communications system, in which the signals representing different data symbols in the communications system are digitally synthesized and the duration of the signals representing the transmitted data symbols is longer than the time period between the start of each of the data symbols. The communication system may have a hardware structure which consists of: memory to store digital samples of the transmitted symbols, associated control and clocking circuitry to read the digital samples from memory, and a digital-to analog converter to translate the digital samples into an analog signal, as well as an arrangement of the digital samples in memory which produces transmitted signals which are longer than the time period between the start of each of the data symbols when the digital samples are clocked out of memory in the correct order by the clocking circuitry.

The digital samples of the transmitted signals stored in memory may be arranged in an N×M matrix, where N represents 2 to the power of the first integer equal to or greater than the ratio of the transmitted signal duration over the symbol time period, and M is the number of digital samples in one symbol time period. The associated control and clocking circuitry of the system may consist of a counter arranged in a divide-by-M configuration (where M is the number of digital samples in one symbol time period), and a $log_2N$-bit shift register, where N is 2 to the power of the first integer equal to or greater than the ratio of the transmitted signal duration over the symbol time period. The associated control and clocking circuitry may consist of the output ports of a microcontroller. There may be two banks of N×M memory, and two D/A convertors, and the output signal may be a vector (i.e. baseband) representation. The N×M memory may be split up into two or more banks and the memory banks may be alternately addressed.

The device and method may use arbitrary waveforms and any type of modulation. Also, the length M, of the counter is equal to the spread spectrum code (i.e. the signal) length—in our case M is equal to the number of samples in a symbol, which is much shorter than the signal length. The overall signal length is M times N samples. The system keeps the serial data serial and does not create parallel overlapping streams.

In an embodiment, in addition to the reduction in circuit complexity and operational power, there is also a corresponding reduction on the speed of the associated control circuitry (be it a microprocessor or less general purpose device, like an ASIC), thereby reducing the power and complexity requirements of these components as well. In other words, the apparatus and method isolate all the high-speed operations to a very small portion of its own circuitry, thereby reducing the demands on the control circuitry.

In an embodiment the apparatus and method comprises two main parts: a hardware portion which contains memory, a means of clocking data out of the memory, and digital-to-analog converters which convert the data to an analog signal, and a software portion which consists of a specific arrangement of data in the memory to achieve the desired system functionality. It is the synergy of both the hardware and software components that allows the apparatus and method to achieve its stated goals.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method for transmitting information in a communication system in which information is transmitted in the form of symbols represented by signals, and in which the duration of the signals is longer than the time period between the start of one symbol and the next, comprising the steps of:
   a) synthesizing waveforms from stored digital data representing waveforms resulting from a summation of overlapping signals, the stored digital data representing waveforms being stored in a memory comprising a number of cells;
   b) transmitting the synthesized waveforms; and
   when data is read from the memory during transmission, address lines are used to select a cell to be accessed, and the stored digital data is organized in the memory in such a way that when the data is read out the values sent on a first set of address lines depend on the sequence of overlapping signals currently being transmitted, and the values sent on a second set of address lines depend on the number of cells that have already been accessed since the most recent start of transmission of a signal.

2. The method of claim 1 in which the memory is read out by control and clocking circuitry including a counter arranged in a divide-by-M configuration, where M is the number of digital samples in the time period between the start of the transmission of one symbol and the start of the transmission of the next symbol, and the output of the counter determines the values sent on the second set of address lines.

3. The method of claim 1 in which the memory is read out by control and clocking circuitry including one or more shift registers the contents of which represent or collectively represent a sequence of symbols being transmitted by the transmitter, the one or more shift registers having an output and the output of the one or more shift registers determines the values sent on the first set of address lines.

4. The method of claim 1 in which the memory is formed at least of two banks of memory and two digital-to-analog converters, and the synthesized waveforms are transmitted as an output signal having a vector representation.

5. The method of claim 1 in which the memory has been split into two or more banks and the banks are alternately addressed.

6. A transmitter portion of a communications system comprising:
   a) a memory storage system, in which is stored data representing waveforms resulting from a summation of overlapping signals;
   b) control and clocking circuitry configured to read data from the memory storage system, the control and clocking circuitry having a part having an output;
   c) at least one digital-to analog converter which converts the data read from the memory storage system to an output analog signal; and
   the memory storage system comprising a number of cells and address lines configured so that the cells are selected to be read one at a time, and the cell to be read is selected by values sent along the address lines, and some of the address lines are connected to the output of the part of the control and clocking circuitry including a counter arranged in a divide-by-M configuration, where M is the number of digital samples in the time period between the start of the transmission of one symbol and the start of the transmission of the next symbol, while other address lines are connected to the output of the part of the control and clocking circuitry including one or more shift registers the contents of which represent or collectively represent a sequence of symbols being transmitted by the transmitter.

7. The transmitter of claim 6 in which the control and clocking circuitry includes at least output ports of a microcontroller.

8. The transmitter of claim 6 in which the memory storage system is formed at least of two banks of memory and two digital-to-analog converters, and the output analog signal has a vector representation.

9. The transmitter of claim 6 in which the memory has been split into two or more banks and the banks are alternately addressed.

* * * * *